April 27, 1926.  
J. B. CHACE  
BELT SHIFTER  
Filed June 30, 1925
1,582,731
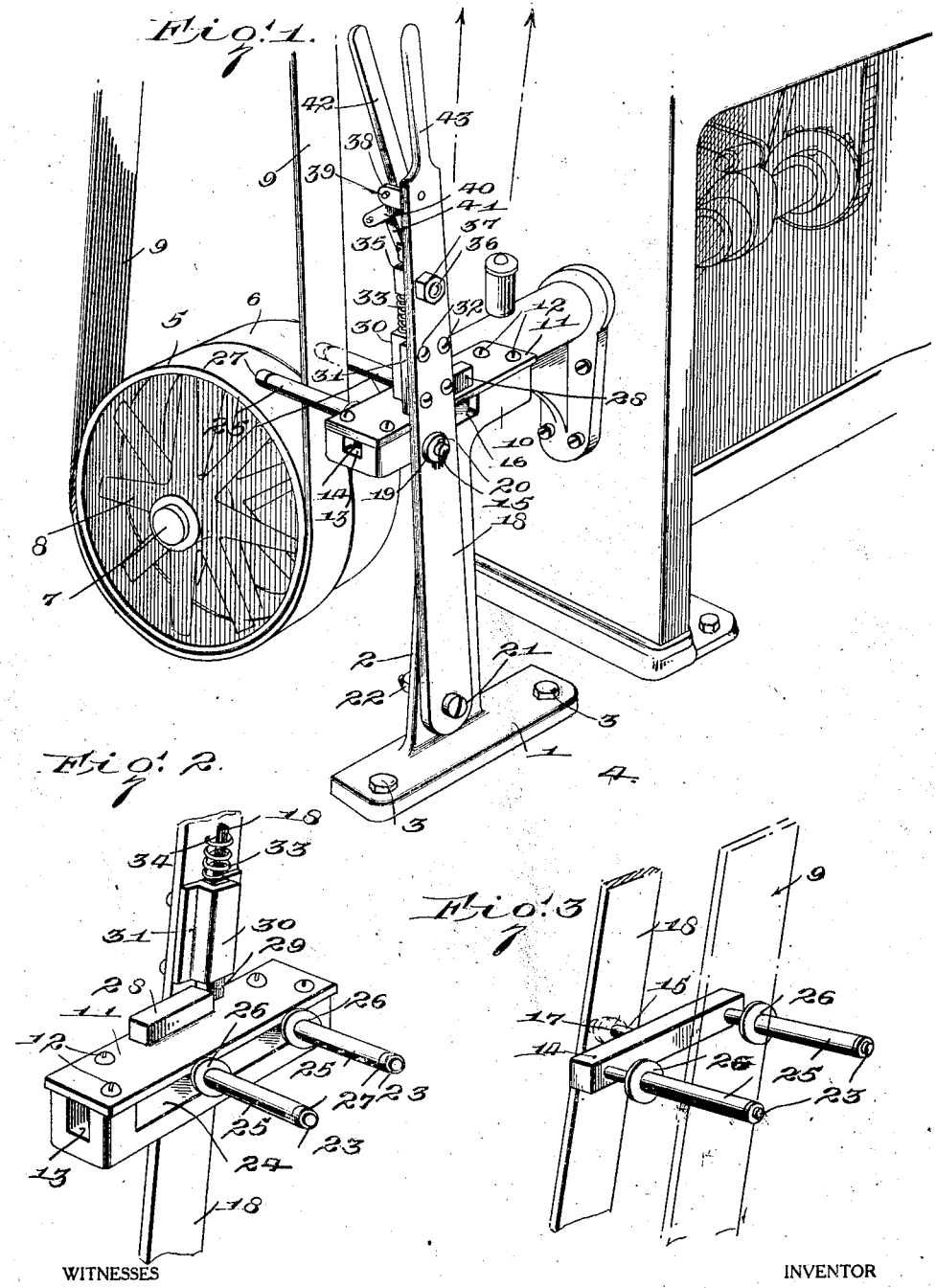
WITNESSES
INVENTOR  
James B. Chace  
BY  
ATTORNEYS Patented Apr. 27, 1926.

1,582,731

UNITED STATES PATENT OFFICE.

JAMES BROWNELL CHACE, OF TIVERTON, RHODE ISLAND.

BELT SHIFTER.

Application filed June 30, 1925. Serial No. 40,592.

*To all whom it may concern:*

Be it known that I, JAMES B. CHACE, a citizen of the United States, and a resident of Tiverton, in the county of Newport and State of Rhode Island, have made certain new and useful Improvements in Belt Shifters, of which the following is a specification.

My invention relates to improvements in belt shifters and it consists in the combinations, constructions and arrangements herein described and claimed.

An object of the invention is the provision of a belt shifter which affords facilities for shifting a belt from a fast pulley to a loose pulley, and vice versa, when desired, and for preventing accidental displacement of the belt from position on either of said pulleys.

A further object of the invention is the provision of a belt shifter of the character described having means adjustable to shift a belt laterally between adjacent pulleys and locking means for retaining the belt shifting means in any one of a plurality of different adjustments.

A still further object of the invention is the provision of a belt shifter which is easy to operate, reliable in use and thoroughly practical commercially.

Other objects and advantages of the invention will be apparent from the following description, considered in conjunction with the accompanying drawings, in which:—

Figure 1 is a perspective view of the improved belt shifter in a desirable position with respect to a fast pulley and a loose pulley on a shaft;

Figure 2 is a fragmentary perspective view of the supporting and guiding structure for the belt shifting means of the device, and Figure 3 is a fragmentary perspective view of certain of the elements of the belt shifting means of the device, showing a portion of a belt in position between a pair of belt engaging members which are comprised in the belt shifting means of the device.

The supporting structure of the improved belt shifter may comprise a bracket having an attaching portion 1 and a supporting portion 2 which extends substantially at right angles to the attaching portion 1. The latter is apertured for the reception of fastening devices, such as the cap bolts 3, for securing the attaching portion 1 flatwise against a support 4. When the device is used as illustrated in Fig. 1, the support 4 is horizontal and may be a floor. The supporting portion 2 of the bracket is upstanding from the attaching portion 1 adjacent to the peripheries of a fast pulley 5 and a loose pulley 6 which are disposed in side by side relation on a horizontal shaft 7, the fast pulley being secured to the shaft in any suitable known manner, as by means of a key 8.

A belt 9 is adapted to be shifted from position to pass about the fast pulley 5, as shown in Fig. 1, to position to pass about the loose pulley 6, and vice versa.

The supporting portion 2 of the bracket carries a horizontal guide casing which may comprise a body portion 10 which is integral with the supporting portion 2 of the bracket at the upper end of the latter, and a cover portion 11 which may be secured to the body 10 of the guide casing by screws 12 or like fastening devices. The body 10 of the guide casing extends substantially at right angles to the direction of length of the supporting portion 2 and is formed with a channel 13 in its upper side extending longitudinally of the body 10 of the guide casing. The channel 10 constitutes a guideway in which a shifter block or bar 14 may slide. A pin 15 extends from the middle portion of the slide block 14 through a slot 16 in the side of the guide casing which is remote from the belt 9. The pin 15 extends loosely through an opening 17 in an operating lever 18. A washer 19 is retained on the end portion of the pin 15 against the lever 18 by a cotter pin 20 or like retaining device.

The opening 17 is formed in the middle portion of the lever 18 which is fulcrumed adjacent to its lower end on a horizontal pivot pin 21 which may be a bolt adapted to cooperate with a nut 22 to connect the lower end portion of the lever 18 with the lower end portion of the supporting portion 2 of the bracket of the supporting structure which is comprised in the device.

The block 14 carries a pair of spaced belt engaging members which comprise rods 23 extending laterally of the block 14 from the opposite end portions of said block through a slot 24 which is formed in the side of the guide casing which is proximate to the belt 9. The slots 16 and 24 therefore are in opposite sides of the guide casing and each is of sufficient length to permit movement of the parts which extend therethrough from the block 14 as the latter is shifted longitudinally of the guideway 13. The rods 23 extend at opposite sides of the belt 9 and carry rollers 25 which are supported adjacent to the opposite edges of the belt 9. The rollers 25 are prevented from moving axially inwardly on the rods 23 for any appreciable distance by washers 26 which space the inner ends of the rollers 25 from the adjacent wall of the guide casing. The rollers 25 may be prevented from sliding outward on the rods 23 by collars 27 which are secured on the extreme end portions of the rods 23.

The cover portion 11 of the guide casing is formed with an upstanding lug or abutment 28 thereon intermediate the ends thereof and adjacent to the edge of the cover 11 which is next to the lever 18. A latch bolt 29 is retained by a guide clip 30 against the lever 18 in position to slide on the lever 18 to and from position to rest at its lower end on the cover of the guide casing at either of the opposite ends of lug or abutment 28 and in contact with the adjacent end of the lug 28. The clip 30 is a channel shaped member, having laterally extending marginal attaching portions 31 secured flatwise against the lever 18 by screws 32. An expansion spring 33 is coiled about an axial extension or stem 34 at the upper end of the latch bolt between the upper end of the latch bolt and an auxiliary guiding and retaining clip 35 having an opening through which the stem 34 extends slidably. The clip 35 may have an attaching portion 36 extending through an opening in the lever 18 and threadedly engaged by a nut 37. A pair of horizontally spaced ears as at 38, are formed on the lever 18 above the guide clip 35. A horizontal pivot element 39, which is carried by these ears, constitutes a fulcrum for a bell crank lever for operating the latch bolt 29 against the action of the spring 33. The bell crank lever 40 thus is swingingly supported between the ears 38 and has a relatively short arm 40 which is connected by a link 41 with the upper end of the latch bolt stem 35. The bell crank lever also includes a longer arm 42 which extends in a generally upward direction relatively close to the upper end portion 43 of the lever 18. The arm 42 of the bell crank lever and the upper end portion 43 of the lever 18 are adapted to be gripped in the hand of an operator so that the arm 42 of the bell crank will be swung toward the plane of the lever 18 and the latch bolt 29 will be raised against the action of the spring 33 until the lower end of the latch bolt is at a level slightly higher than that of the abutment 28. The lever 18 then may be swung about the axis of its fulcruming member 21 and the block 14 will be shifted in the guideway 13. This shifting of the block 14 will cause shifting of the belt engaging members 23—25 and the belt thus may be shifted from position to engage with the fast pulley 5 to position to engage with the loose pulley 6, and vice versa. When the lever 18 is at one end of its throw, the belt 9 will pass about the fast pulley 5 and the latch bolt will be moved to position to bear at its lower end on the guide casing at one end of abutment 28 when the arm 42 of the bell crank has been released to permit the spring 33 to act to force the latch bolt 29 downward. When the lever 18 is at the opposite end of its stroke, the belt 9 will be in position to pass about the loose pulley 6 and the latch bolt 29 will be in position to bear against the guide casing at the opposite end of the abutment when said latch bolt has been actuated by the spring 33. The latch bolt and the abutment therefore will cooperate to prevent accidental shifting of the lever 18 from position at either end of its throw and the belt thus will be held against accidental lateral displacement from position on either one of the two adjacent pulleys between which it can be shifted by the improved belt shifter when the latter has been actuated manually.

The device is easy to install and operate, strong and durable, and not likely to get out of order easily.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. A belt shifter comprising a supporting structure, a lever fulcrumed on said supporting structure, belt shifting means movable with said lever for engaging a belt to shift said belt from one pulley to an adjacent pulley, an abutment on said supporting structure, a spring pressed latch bolt carried by said lever for cooperating with said abutment to lock said lever to said supporting structure at opposite ends of the throw of said lever, and a latch bolt operating lever carried by said first named lever in position to be gripped by the same hand that holds said first named lever and then actuated to shift said latch bolt to position to disengage said abutment to permit the throw of said first named lever.

2. A belt shifter comprising a supporting structure, a lever fulcrumed on said supporting structure, belt shifting means movable with said lever for engaging a belt to shift said belt from one pulley to an adjacent pulley, an abutment on said supporting structure, a spring pressed latch bolt carried by said lever for cooperating with said abutment to lock said lever to said supporting structure at opposite ends of the throw of said lever, a latch bolt operating lever carried by said first named lever and operable to shift said latch bolt to position to disengage said abutment to permit the throw of said first named lever, said first named lever and said latch bolt operating lever having adjacent handle portions adapted to be gripped in the hand of an operator to effect actuation of said lever for operating said latch bolt.

3. A belt shifter comprising a bracket comprising an elongated supporting member having an attaching portion adapted to be secured to a support, a guide casing carried by the supporting member of said bracket, said guide casing having a longitudinal guideway and being formed with longitudinally extending lateral slots in its side walls, a slide block movable along said guideway, a pair of spaced belt engaging members extending from said block through one of said lateral slots at opposite sides of a belt, a pin extending from said block through the opposite lateral slot of said guide casing, and an operating lever fulcrumed on said bracket below said guide casing and having a transverse opening through which said pin extends, whereby the throw of said lever will cause shifting of said block along said guideway and corresponding lateral movement of the belt engaging members along the slot through which said belt engaging members extend.

4. A belt shifter comprising a bracket, a guide casing carried by said bracket, said guide casing having a longitudinal guideway and being formed with longitudinally extending lateral slots in its side walls, a slide block movable along said guideway, a pair of spaced belt engaging members extending from said block through one of said lateral slots at opposite sides of a belt, a pin extending from said block through the opposite lateral slot of said guide casing, an operating lever fulcrumed on said bracket below said guide casing and having a transverse opening through which said pin extends, whereby the throw of said lever will cause shifting of said block along said guideway and corresponding lateral movement of the belt engaging members along the slot through which said belt engaging members extend, said belt engaging members carrying rollers adapted to have rolling contact with the side edges of said belt.

5. A belt shifter comprising a bracket comprising an upright supporting member having an attaching portion at its lower end, a guide casing carried by the upright supporting member of said bracket, said guide casing having a longitudinal guideway and being formed with longitudinally extending lateral slots in its side walls, a slide block movable along said guideway, a pair of spaced belt engaging members extending from said block through one of said lateral slots at opposite sides of a belt, a pin extending from said block through the opposite lateral slots of said guide casing, and an operating lever fulcrumed on said bracket below said guide casing and having a transverse opening through which said pin extends, whereby the throw of said lever will cause shifting of said block along said guideway and corresponding lateral movement of the belt engaging members along the slot through which said belt engaging members extend, an abutment on said guide casing, and a spring pressed latch bolt carried by said lever and adapted to bear against said guide casing at opposite ends of said abutment when the lever is at opposite ends of its throw.

JAMES BROWNELL CHACE.